May 20, 1930.   L. ALEXANDER   1,759,180
TOY OR AMUSEMENT VEHICLE
Filed April 7, 1927
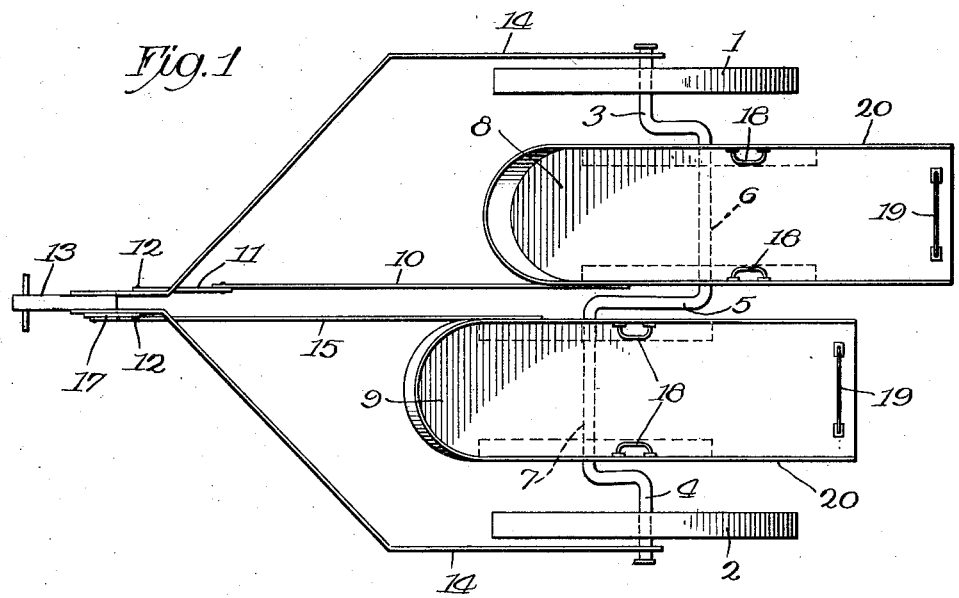
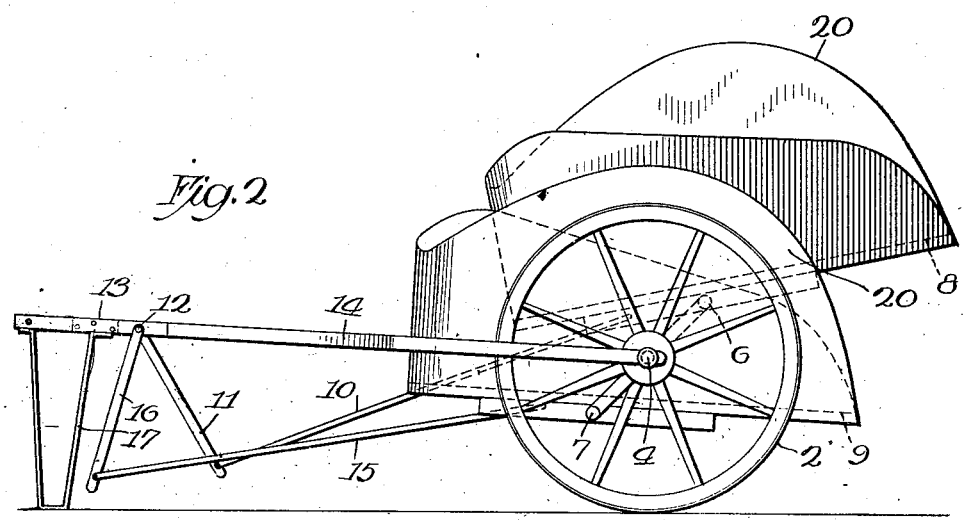
Inventor:
Lewis Alexander
By Arthur F. Durand
Atty.

Patented May 20, 1930

1,759,180

UNITED STATES PATENT OFFICE

LEWIS ALEXANDER, OF CLINTON, ILLINOIS

TOY OR AMUSEMENT VEHICLE

Application filed April 7, 1927. Serial No. 181,664.

This invention relates to toy carts, or amusement carts, or wheeled vehicles for use by children or others for amusement purposes.

Generally stated, the object of the invention is to provide a wheeled toy or amusement vehicle having one or more seats and provided with means for causing the seat or seats to rise and fall as the cart is pulled or pushed along.

A special object is to provide a novel construction and arrangement whereby a cart of this kind will have a plurality of seats, arranged side by side, in combination with a crank axle upon which the seats are mounted, with the cranks so relatively formed that one seat will be rising while another seat is moving downward.

It is also an object to provide certain details and features of construction tending to increase the general efficiency and desirability of a toy cart or amusement vehicle of this particular character.

To these and other useful ends, the invention consists in the matters hereinafter set forth and claimed, and shown in the accompanying drawings, in which,—

Fig. 1 is a plan of a toy cart or amusement vehicle embodying the principles of the invention.

Fig. 2 is a side elevation of the same.

As thus shown, the invention comprises a pair of cart wheels 1 and 2 fixed on the end portions 3 and 4 of the crank shaft 5, which latter has the two cranks 6 and 7 set one hundred and eighty degrees apart. A seat 8 is provided on its under side with bearings in which the crank 6 rotates, and a similar seat 9 is provided on its under side with bearings in which the crank 7 rotates. The rod 10 is rigid with the seat 8 and has its forward end pivoted on the lower end of the swinging link 11, which latter is pivoted at 12 on the tongue 13, which latter has its yoke portions 14 swiveled on the end portions 3 and 4 of the crank shaft. A similar rod 15 is rigid with the seat 9 and has its forward end pivoted on the lower end of a similar link 16, which latter is also pivoted at 12 on the tongue. A support 17 is fixed rigidly upon the under side of the tongue, at its end, and rests upon the ground when the vehicle is not in motion.

The seats are provided, on the inner side of the side walls thereof, with handles 18, and foot rests 19 are provided on the ends of the seats.

With this construction, a child or person will sit in each of the two seats 8 and 9, with their backs to the tongue, and a child or other person will raise the tongue and push the seat forward. This will cause the crank shaft to rotate, and the cranks will move the seats up and down, alternately, one seat rising while the other is moving downward, and the seats also, of course, having some forward and backward movement as well.

The outer walls 20 are preferably made higher, as shown, than the wheels, so that they extend above the wheels even when the seats are in their lowest position. This tends to protect the occupants of the seats, as an outstretched arm or hand is not so liable to touch the wheels.

Without disclaiming anything, and without prejudice to any novelty disclosed, what I claim as my invention is:

1. In vehicles for amusement purposes, the combination of wheels having a common axis and means for propelling the vehicle, a seat on said vehicle, and instrumentalities for causing back and forth movement of the seat, horizonally automatically, while at the same time oscillating and tilting about a single supporting axis which automatically shifts from one vertical plane to another relatively to said axis, when the vehicle is in motion.

2. A structure as specified in claim 1, said instrumentalities comprising a crank shaft having a revolving crank portion upon which said seat is mounted, forming said single shifting axis of oscillation for the seat, which single supporting axis revolves about said wheel axis whereby said seat has both up and down and forward and backward motion while oscillating about said shifting axis.

3. A structure as specified in claim 1, there being a plurality of said seats, said instrumentalities causing one seat to move forward in one direction while another seat is moving backward in the opposite direction.

4. A structure as specified in claim 1, there being a plurality of said seats, said instrumentalities comprising a crank shaft having a crank for each seat, each crank forming said supporting axis of its allotted seat, each supporting axis revolving about said wheel axis, there being a wheel fixed on each end portion of said crank shaft, a tongue forming said means for propelling the vehicle, and means connecting the seats with the tongue to keep the seats upright, and whereby each seat has said oscillating motion as well as up and down and forward and back motion.

Specification signed this 1st day of April, 1927.

LEWIS ALEXANDER.